June 13, 1933.  M. LEUPOLD  1,914,267

STEERING AND DIRECTING MECHANISM

Filed May 1, 1931  3 Sheets-Sheet 1

WITNESSES
Edw. Thorpe
E. B. Marshall

INVENTOR
Mathias Leupold
BY Munn & Co
ATTORNEY

June 13, 1933.                M. LEUPOLD                 1,914,267
                    STEERING AND DIRECTING MECHANISM
                    Filed May 1, 1931        3 Sheets-Sheet 2
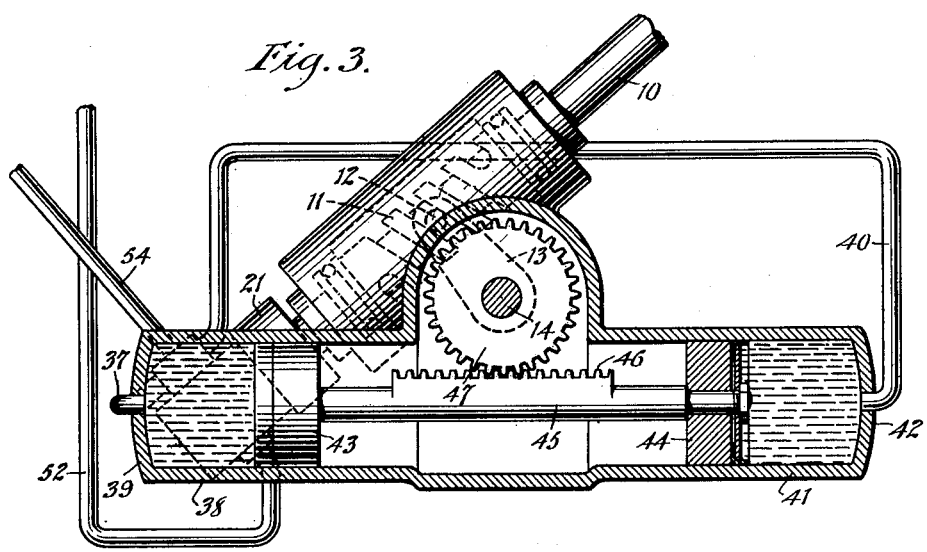
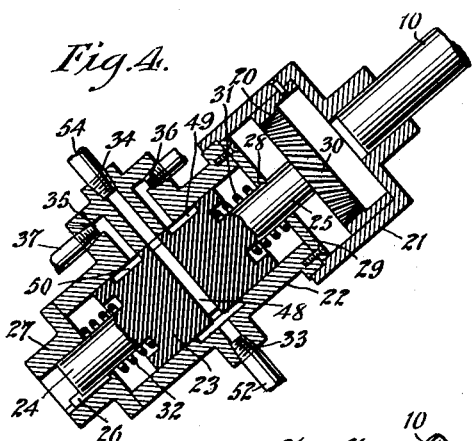
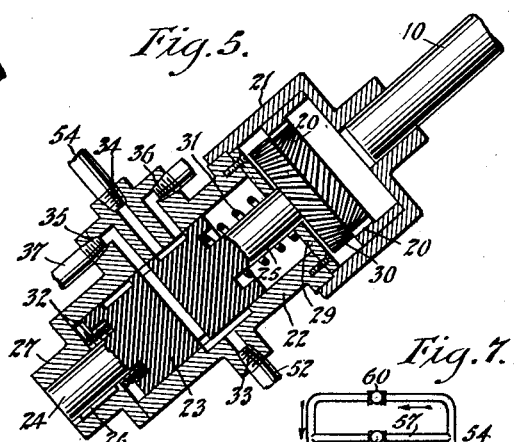
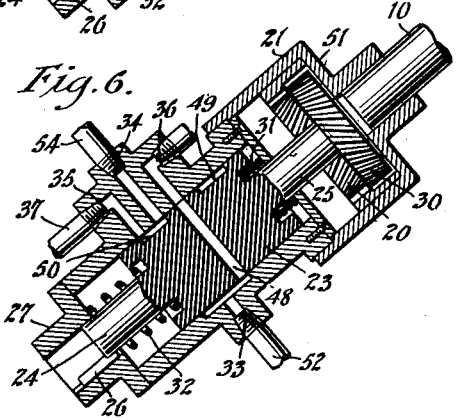
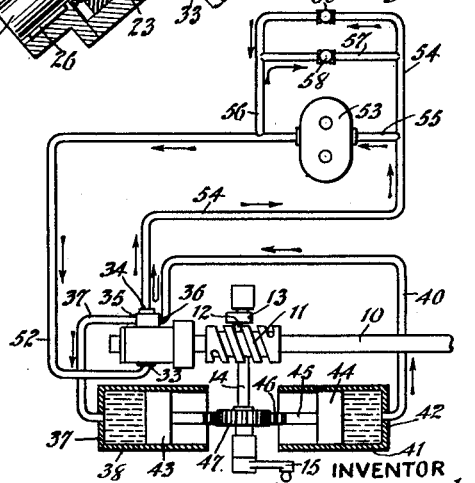
WITNESSES
Edw. Thorpe
E. B. Marshall
INVENTOR
Mathias Leupold
BY Munn & Co.
ATTORNEY

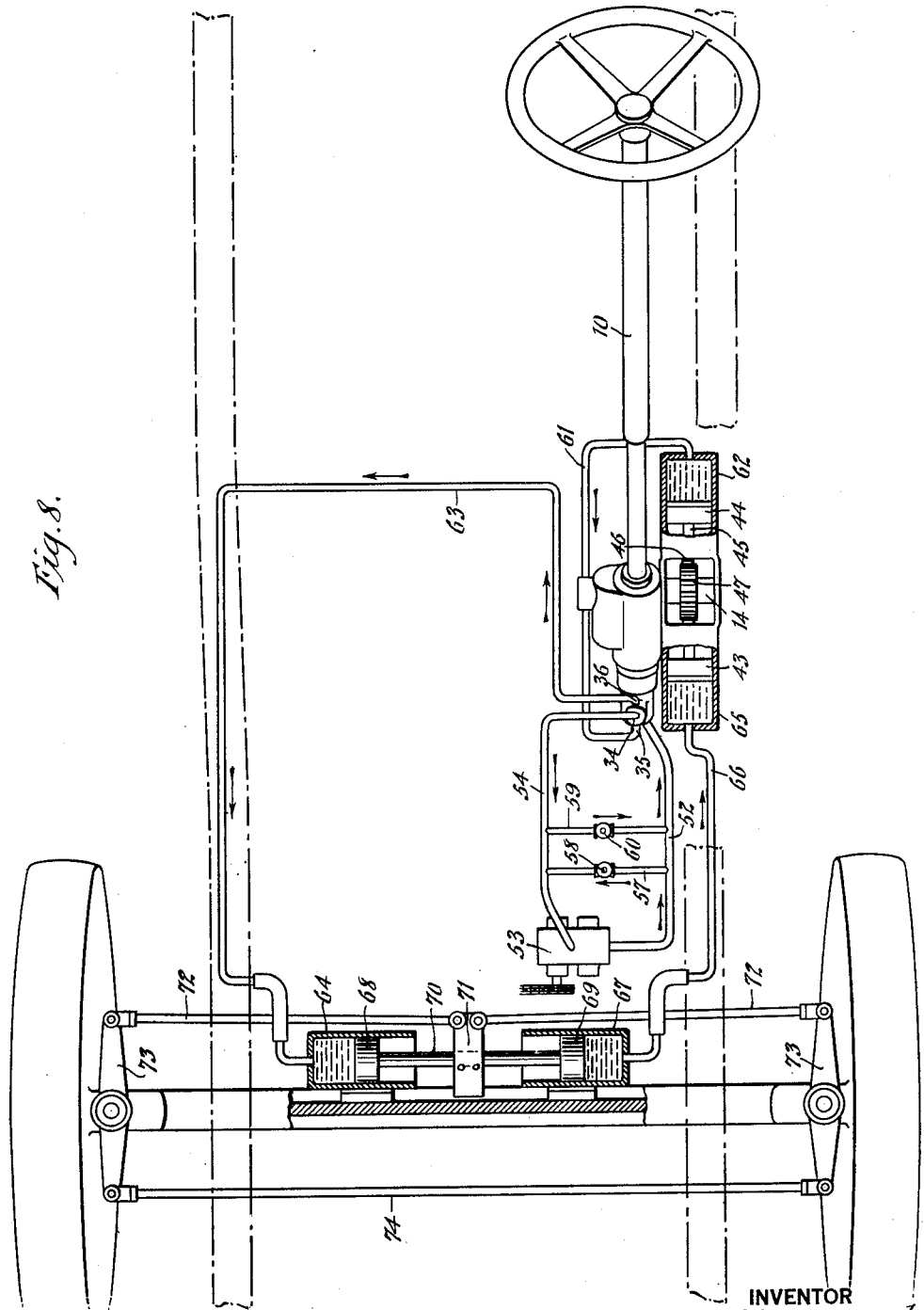

Patented June 13, 1933

1,914,267

UNITED STATES PATENT OFFICE

MATHIAS LEUPOLD, OF JAMAICA, NEW YORK

STEERING AND DIRECTING MECHANISM

Application filed May 1, 1931. Serial No. 534,349.

An object of the invention is to provide a steering and directing mechanism which, while of particular value as a means of steering automotive vehicles, may also be used with equally good results as a means of steering vessels and aircraft and as a means for moving wings of an aircraft relatively to the fuselage. In fact, the steering and directing mechanism may be used for many purposes on land, in the water and in the air.

Another object of the invention is to provide a steering column which is operatively connected with a steering and directing mechanism and which is also connected with a power means for operating the steering and directing mechanism, so that the steering column will serve to operate the steering and directing mechanism either directly or through the power means. When the steering and directing mechanism is operated by the power means, the direct connection of the steering column with the steering and directing mechanism will serve to regulate or control the movement of the steering or directing mechanism by the power means.

Still another object of the invention is to provide a steering column with gearing operatively connected with a steering and directing mechanism, the steering column also having valve operating means for directing a fluid under pressure to the steering or directing mechanism for operating the latter.

A further object of the invention is to provide a shaft operatively connected by gearing with a steering column, the shaft having means for operating a piston rod secured to a piston operable under pressure to operate the steering or directing mechanism.

The invention furthermore comprehends a steering column having a gear which operates a valve controlling the power means for operating the steering or directing mechanism. Preferaby the steering column has a helical gear which meshes with a helical gear on the stem of the valve controlling the power means to move the valve to and from the steering column.

Additional objects of the invention will appear in the following specification in which the preferred form of the invention is described.

Figure 1:
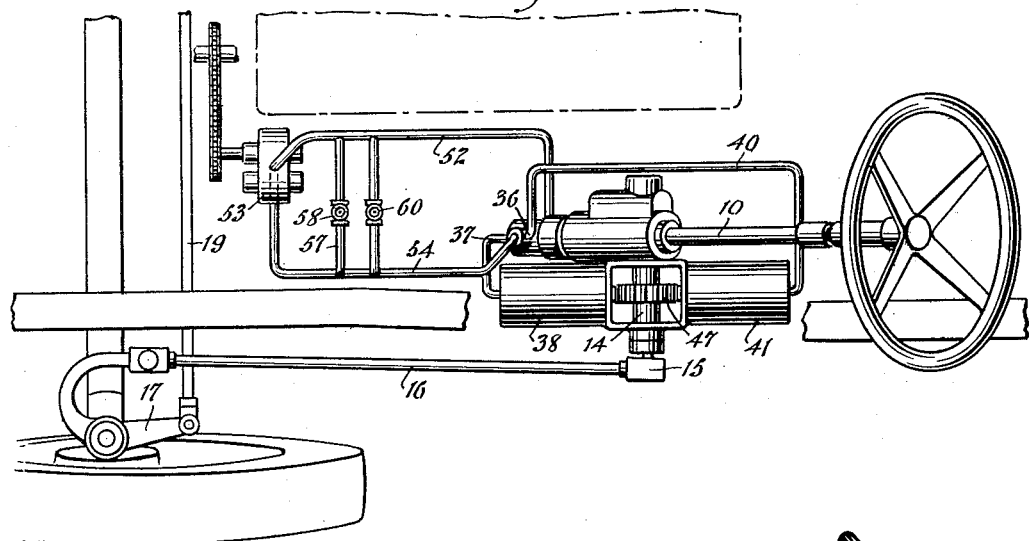
Figure 2:
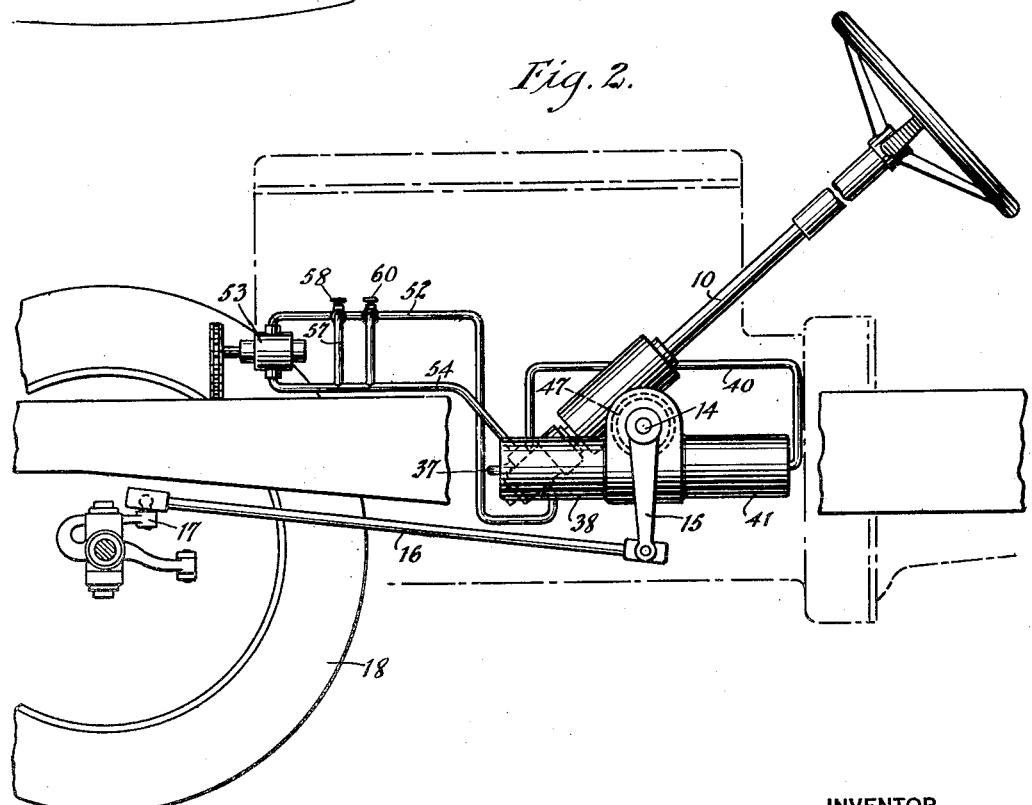

In the drawings similar reference characters refer to similar parts in all the views, of which Figure 1 is a fragmentary plan view illustrating the manner in which the invention may be applied to an automotive vehicle, Figure 2 is a side elevation of Figure 1, Figure 3 is an enlarged fragmentary sectional view illustrating the lower portion of the steering column, the cylinders with the pistons therein and the connection of these pistons with the shaft which is rotated by a worm on the steering column, Figure 4 is a fragmentary sectional view illustrating the valve which is operated by the steering column, Figure 5 is a sectional view similar to the view illustrated in Figure 4, but with the valve in another position relatively to the valve casing, Figure 6 is another sectional view similar to the view illustrated in Figure 4, but with the valve in still another position, Figure 7 is a diagrammatic view illustrating the connections between the pump, the valve and the cylinders, and Figure 8 is a diagrammatic view illustrating a modified form of the invention.

The invention as illustrated in the drawings is applied to an automotive vehicle, but it will be understood that the invention may be used in connection with the direction of steering of various vehicles and devices.

By referring to the drawings it will be seen that the steering column 10 is provided with a worm 11 which is engaged by a wrist 12 on a crank 13 secured to a shaft 14. It will be understood that by turning the steering column 10, the shaft 14 will be rotated on its axis by means of the crank 12 and the wrist 12 shown in Figure 3. This shaft 14, in the form of the invention illustrated in Figures 1 and 2, has secured thereto an arm 15 which is connected by a link 16 with a steering arm 17 on an automotive vehicle having wheels 18, one of which is shown in the drawings, these wheels being connected by a radius bar 19 in a customary manner. By the means which has been described it is possible to steer the automotive vehicle by means of the steering column 10.

It is not only possible to steer or direct the vehicle by means of the steering column 10, but it is also possible, by the said steering column 10, to control a power steering mechanism through the helical gear 20, which is secured to the lower terminal of the steering column 10. This helical gear 20 is secured to a casing 21 which is secured to the steering column 10, the helical gear 20 being an internal gear with its teeth disposed inwardly. The casing 21 is mounted for rocking on the valve casing 22, in which a valve 23 is disposed, the said valve 23 having valve stems 24 and 25 extending at its ends, the valve stem 24 being keyed at 26 in a neck 27 of the valve casing 22 and the valve stem 25 being journaled in a bearing 28 in a head 29 on the valve casing 22. Secured to the valve stem 25 beyond the head 29 and disposed within the casing 21, there is a helical gear 30 having outer teeth for meshing with the inner teeth on the helical gear 20, a spring 31 being disposed between the valve 23 and the head 29 and a spring 32 being disposed between the valve 23 and the neck 27 for holding the valve 23 relatively to its casing in the position illustrated in Figure 4 of the drawings and with the helical gear 30 disposed within the helical gear 20. It will be seen that the helical gear 20 is rotatably mounted on the steering column 10 and the gear 30 is only permitted to reciprocate with the valve 23.

The valve casing 22 has an inlet 33, an outlet 34 and two additional outlets 35 and 36, the outlet 35 being connected by a pipe 37 with a cylinder 38 through its cylinder head 39 and the outlet 36 being connected by a pipe 40 with a cylinder 41 through its cylinder head 42. There is a piston 43 in the cylinder 38 and there is a piston 44 in the cylinder 41, these two pistons 43 and 44 being connected by a piston rod 45 which is provided with a rack 46 which meshes with a gear 47 secured to the shaft 14.

The valve 23 has a passage 48 which connects the inlet 33 with the outlet 34 when the valve is in neutral position, as illustrated in Figure 4. When the valve is in the said neutral position, the outlet 36 communicates with a passage 49 in the valve 23 and the outlet 35 communicates with a passage 50 in the valve 23, but when the valve is in the said neutral position, it will be seen by referring to Figure 4 of the drawings that the said passages 49 and 50 only communicate with the outlets 36 and 35 respectively.

However, when the valve 23 is moved to the position illustrated in Figure 5 of the drawings, and against the resiliency of the spring 32, the passage 48 will connect the inlet 33 with the outlet 35 and the outlet 36 will be connected with the outlet 34 through the passage 49.

By referring to Figure 6 of the drawings there will be seen the other position of the valve, when the valve has been moved against the resiliency of the spring 31 to connect the inlet 33 with the outlet 36, the outlet 35 being connected with the outlet 34 through the passage 50.

It will be understood that by rotating the steering column 10 in one direction, the helical gear 30 may be moved from the neutral position of the valve, as illustrated in Figure 4 to the position illustrated in Figure 5, where the helical gear 30 will be disposed adjacent the head 29 of the valve casing and the valve 23 will be disposed to connect the parts, as illustrated in Figure 5.

When the steering column 10 is rotated in the opposite direction, the helical gear 30 will be moved to the position illustrated in Figure 6 adjacent the head 51 of the casing 21 to move the valve 23 to the position where the ports will be connected, as illustrated in Figure 6.

The inlet port 33 is connected with a pipe 52 leading from a pump 53 and the outlet port 34 is connected by a pipe 54 and a pipe 55 with the said pump. As has been stated, the pipe 40 connects the cylinder 41 with the inlet 36 and the pipe 37 connects the port 35 with the cylinder 38. It will therefore be understood that when the pump is operating to direct a fluid through the pipe 52 to the inlet 33, the direction of this fluid may be controlled by means of the valve which is operated by the steering column 10 in the manner described. Therefore, the steering mechanism may be operated by the said fluid pressure in the cylinders 38 and 41 and, by the direct connection of the steering column 10 with the shaft 14 through the crank 13 and the wrist 12, the driver or operator may control the rotary movement of the shaft 14 as it is driven by the pistons 43 and 44 through the piston 45 and the rack 46 meshing with the gear 47, and thereby prevent any sudden rotary movement of the shaft 14 under the influence of the power means driven by the fluid pressure.

It is therefore possible to operate the steering or directing mechanism by power means under fluid pressure and to at all times control the movement of the steering or directing mechanism through the direct connection between the steering column 10 and the shaft 14 through the wrist 12 and the crank 13.

It will further be understood that it is possible to operate the steering and directing mechanism through the steering column 10 independently of the power means operating through the pistons 33 and 34, inasmuch as the steering column 10 may be used to rotate the shaft 14 to operate the steering and directing mechanism.

The pipe 54 leads beyond the pipe 55 connecting it with the pump 53, and there is a pipe 56 which is connected with the pipe 54 beyond the pipe 55 by a by-pass 57 in which there is a valve 58. The pipe 54 is also connected with the pipe 56 by a second by-pass 59 in which there is a valve 60. The valve 58 may be a check valve, permitting the fluid to flow from the pump 53, directly from the pipe 56 to the pipe 54, which will serve to relieve pressure in the pipe 52, when the valve 23 is moving from one position to another position connecting the ports in the manner described.

In the modified form of the invention illustrated in Figure 8 of the drawings, the steering column 10 is connected with the shaft 14 in the manner described with reference to the forms of the invention illustrated in Figures 1, 2, 3 and 7 of the drawings, and the valve with its valve casing is arranged as illustrated in Figures 4, 5 and 6 of the drawings. However, in this form of the invention the outlet port 35 is connected by a pipe 61 with the cylinder 62, the outlet 36 is connected by a pipe 63 with the head of a cylinder 64, the cylinder 65 is connected by a pipe 66 with the head of a cylinder 67, the port 34 being connected by a pipe 54 with the pump 53, and the pump 53 being connected by a pipe 52 with the inlet port 33. The pistons 43 and 44 are connected by a piston rod 45 having the rack 46 meshing with the gear 47 on the shaft 14.

In this form of the invention there is a piston 68 in the cylinder 64 and there is a piston 69 in the cylinder 67, these pistons being connected by a piston rod 70 having a block 71 connected by links 72 with steering levers 73, the said steering levers 73 being also connected by a radius arm 74. In this form of the invention it will be seen that when the valve is in neutral position, the fluid will flow under the pressure from the pump through the passage 48 in the valve 23, as illustrated in Figure 4, but when the valve is moved to the position illustrated in Figure 5, the fluid will flow from the outlet port 35, through the pipe 61 against the piston 44 and the fluid in the cylinder 65 will flow through the pipe 66 into the cylinder 67 and the fluid in the cylinder 64 will flow through the pipe 63 to the outlet port 36, which will communicate with the outlet 34 leading to the pump.

This will serve to move the block 71 under the influence of the pistons 68 and 69 to turn the steering lever 73 in one direction. When the valve has been moved by the steering lever to the position illustrated in Figure 6 of the drawings, the inlet port 33 will be connected by the passage 48 with the outlet port 36 leading to the pipe 63 and to the cylinder 64, and the cylinder 67 will be connected by the pipe 66 with the cylinder 65 and the cylinder 62 will be connected by the pipe 61 with the outlet port 35, which, through the passage 50, will lead to the outlet port 34 which is connected with the pump.

It will therefore be seen that in the modified use of the invention, the essential features of the invention are employed to operate the steering or directing mechanism through the steering column 10, which serves to operate the steering or directing mechanism directly, and also through a power means, the said power means being controlled by the direct connection of the steering wheel with the steering or directing mechanism to prevent any sudden movement of the steering or directing mechanism under the influence of the power means.

From the above it will be understood that normally the steering or directing mechanism will be operated by the power means and that this movement will be controlled by the direct connection of the steering column 10 with the shaft 14, but that, should there be any failure in connection with the operation of the power means, the steering or directing mechanism may not only be controlled, but may be operated by the direct connection of the steering column 10 with the shaft 14. The power steering mechanism makes it possible for a very heavy vehicle to be steered or directed with very little effort, and this is so whether the vehicle be in motion, or be at rest, for, when the vehicle is at rest, the steering wheels may nevertheless be turned by the fluid pressure in the cylinders. Not only is it possible to steer or operate the power means readily and with little effort, but the power means may be operated quickly to make it possible to turn a vehicle quickly in narrow passages and to maneuver in parking spaces.

It will be understood that any desired fluid may be used and be forced through the pipes by the pump 53. Preferably the pump 53 may be operated in any desired manner by the automotive engine or motor.

What is claimed is:

1. In a steering and directing mechanism, a column, a directing means, means connecting the column with the directing means for operating the latter, a fluid pressure means for operating the directing means, a valve for controlling the fluid pressure means, a helical gear on the column, a helical gear on the valve, and resilient means for holding one of the helical gears yieldingly in engagement with the other helical gear.

2. In a steering and directing mechanism, a column, a directing means, means connecting the column with the directing means for operating the latter, a fluid pressure means for operating the directing means, a valve for controlling the fluid pressure means, a gear on the column, a gear on the valve, one of the gears having inner helical teeth and the other gear having outer helical teeth for engaging the inner helical teeth on the other gear, and resilient means for holding the valve with its gear positioned for meshing with the gear on the column.

3. In a steering and directing mechanism, a column having a worm and a gear, a directing means having a shaft with a crank, the crank having a wrist engaging the worm, a fluid pressure means for rotating the shaft, a valve for controlling the fluid pressure means, a gear on the valve, one of the gears having inner helical teeth and the other gear having outer helical teeth for engaging the inner helical teeth on the other gear, and resilient means for holding the valve with its gear positioned for meshing with the gear on the column.

4. In a steering and directing mechanism, two cylinders, pistons in the cylinders, a piston rod secured to the pistons, a shaft, means operatively connecting the piston rod and the shaft, a column, means operatively connecting the column with the shaft, a valve having communication with the cylinders, the valve having a helical gear, and a helical gear disposed axially of the column and secured thereto for engaging the first mentioned helical gear.

5. In a steering and directing mechanism, two cylinders, pistons in the cylinders, a piston rod secured to the pistons, a shaft, means operatively connecting the piston rod and the shaft, a column, means operatively connecting the column with the shaft, a valve having a helical gear, a helical gear on the column for engaging the first mentioned helical gear, and resilient means for holding the valve yieldingly with its helical gear in position for meshing with the helical gear on the column.

6. In a steering and directing mechanism, a valve casing having an inlet port, an outlet port and two additional outlet ports, a valve in the valve casing having a passage for connecting the inlet port with any one of the outlet ports, and two additional passages for connecting the additional outlet ports one at a time with the first mentioned outlet port, two cylinders, pistons in the cylinders, a directing means, means by which the pistons are adapted to operate the directing means, means connecting the additional outlet ports with the cylinders respectively, and a pump connected with the inlet port and the first mentioned outlet port.

7. In a steering and directing mechanism, a valve casing having an inlet port, an outlet port and two additional outlet ports, a valve in the valve casing having a passage for connecting the inlet port with any one of the outlet ports, and two additional passages for connecting the additional outlet ports one at a time with the first mentioned outlet port, two cylinders, pistons in the cylinders, a directing means, means by which the pistons are adapted to operate the directing means, means connecting the additional outlet ports with the cylinders respectively, a pump connected with the inlet port and the first mentioned outlet port, a column, and gearing connecting the column with the valve for operating the latter.

8. In a steering and directing mechanism, a valve casing having an inlet port, an outlet port and two additional outlet ports, a valve in the valve casing having a passage for connecting the inlet port with any one of the outlet ports, and two additional passages for connecting the additional outlet ports one at a time with the first mentioned outlet port, two cylinders, pistons in the cylinders, a directing means, means by which the pistons are adapted to operate the directing means, means connecting the additional outlet ports with the cylinders respectively, a pump connected with the inlet port and the first mentioned outlet port, a column, and helical gearing connecting the column with the valve for moving the valve to and from the column.

9. In a steering and directing mechanism, a valve casing having an inlet port, an outlet port and two additional outlet ports, a valve in the valve casing having a passage for connecting the inlet port with any one of the outlet ports, and two additional passages for connecting the additional outlet ports one at a time with the first mentioned outlet port, two cylinders, pistons in the cylinders, a directing means, means by which the pistons are adapted to operate the directing means, means connecting the additional outlet ports with the cylinders respectively, a pump connected with the inlet port and the first mentioned outlet port, a column having a helical gear, a helical gear on the valve, and resilient means for holding the valve with its helical gear in position to mesh with the helical gear on the column.

10. In a steering and directing mechanism, a valve casing having an inlet port, an outlet port and two additional outlet ports, a valve in the valve casing having a passage for connecting the inlet port with any one of the outlet ports and additional passages for connecting the additional outlet ports one at a time with the first mentioned outlet port, two cylinders, pistons in the cylinders, a piston rod connecting the pistons, a column, a shaft, means connecting the column with the shaft for rotating the latter, means operatively connecting the piston rod with the shaft, means connecting the additional outlet ports with the cylinders respectively, a pump connected with the inlet port and the first mentioned outlet port, and means connecting the column with the valve for operating the latter.

11. In a steering and directing mechanism, a column, a shaft, means connecting the column with the shaft for rotating the latter, two cylinders, pistons in the cylinders, a piston rod connecting the pistons, means operatively connecting the shaft and the piston rod, a pump, a valve means connecting the pump with the cylinders, and helical means disposed axially of the column and cooperating with the column and the valve means for operating the latter.

12. In a steering and directing mechanism, a column, a shaft, means connecting the column with the shaft for rotating the latter, two cylinders, pistons in the cylinders, a piston rod connecting the pistons, means operatively connecting the shaft and the piston rod, a pump, a valve means connecting the pump with the cylinders, helical means disposed axially of the column and cooperating with the column and the valve means for operating the latter, and means by which the pistons are adapted to operate a directing means.

13. In a steering and directing mechanism, a column, a directing means, means connecting the column with the directing means at all times for operating the latter, a fluid pressure means for operating the directing means, a valve for controlling the fluid pressure means, a helical gear on the column, and a helical gear on the valve meshing with the first mentioned helical gear.

14. In a steering and directing mechanism, a column having a worm and a gear, a directing means having a shaft with a crank, the crank having a wrist engaging the worm, a fluid pressure means for rotating the shaft, a valve for controlling the fluid pressure means, and a gear on the valve, one of the gears having inner helical teeth and the other gear having outer helical teeth for engaging the inner helical teeth on the other gear.

15. In a steering and directing mechanism, a column, a shaft, means connecting the column with the shaft for rotating the latter, two cylinders, pistons in the cylinders, a piston rod connecting the pistons, means operatively connecting the shaft and the piston rod, a fluid pressure means, a piston in the fluid pressure means and provided with means for operating a directing means, a pump, a valve, a communicating means connecting one of the cylinders to one end of the fluid pressure means, a communicating means connecting the other cylinder with the valve, a communicating means connecting the valve with the other end of the fluid pressure means, and communicating means connecting the valve with the pump.

16. In a steering and directing mechanism, a column, a shaft, means connecting the column with the shaft for rotating the latter, two cylinders, pistons in the cylinders, a piston rod connecting the pistons, means operatively connecting the shaft and the piston rod, a fluid pressure means, a piston or pistons in the fluid pressure means and provided with means for operating a directing means, a pump, a valve, a communicating means connecting one of the cylinders to one end of the fluid pressure means, a communicating means connecting the other cylinder with the valve, a communicating means connecting the valve with the other end of the fluid pressure means, communicating means connecting the valve with the pump, and means connecting the column with the valve for operating the latter.

Signed at New York in the county of New York and State of New York this 28th day of April, 1931.

MATHIAS LEUPOLD.